United States Patent
Fryer et al.

(10) Patent No.: US 9,020,760 B2
(45) Date of Patent: Apr. 28, 2015

(54) SYSTEM FOR CLASSIFYING STREETS FOR VEHICLE NAVIGATION

(75) Inventors: Mark Fryer, Lincoln (NZ); Sebastien Sydney Robert Bigot, Christchurch (NZ)

(73) Assignee: Telogis, Inc., Aliso Viejo, CA (US)

( * ) Notice: Subject to any disclaimer, the term of this patent is extended or adjusted under 35 U.S.C. 154(b) by 60 days.

(21) Appl. No.: 13/587,705

(22) Filed: Aug. 16, 2012

(65) Prior Publication Data

US 2013/0204524 A1 Aug. 8, 2013

Related U.S. Application Data

(60) Provisional application No. 61/596,538, filed on Feb. 8, 2012.

(51) Int. Cl.
| | |
|---|---|
| G08G 1/123 | (2006.01) |
| G01C 21/34 | (2006.01) |
| G08G 1/00 | (2006.01) |
| G06Q 10/04 | (2012.01) |

(52) U.S. Cl.
CPC ............ G01C 21/3453 (2013.01); G01C 21/34 (2013.01); G01C 21/3407 (2013.01); G08G 1/202 (2013.01); G06Q 10/047 (2013.01)

(58) Field of Classification Search
CPC .................................................... G01C 21/34
USPC ......................................... 701/533, 540, 527
See application file for complete search history.

(56) References Cited

U.S. PATENT DOCUMENTS

| | | | |
|---|---|---|---|
| 5,712,788 A | 1/1998 | Liaw et al. | |
| 6,680,694 B1 * | 1/2004 | Knockeart et al. | 342/357.31 |
| 7,110,879 B2 | 9/2006 | Friedrichs et al. | |
| 8,510,040 B2 * | 8/2013 | Nesbitt | 701/437 |
| 2003/0158652 A1 | 8/2003 | Friedrichs et al. | |
| 2011/0251783 A1 | 10/2011 | Doi | |

OTHER PUBLICATIONS http://www.stonybrook.edu.libmap/metadata.htm; Magert, Metadata Primer for Map Librarians; last accessed on Nov. 22, 2011, in 4 pages.
http://code.google.com/apis/maps/documentation/directions/; Google Maps API Web Services; The Google Directions API; last accessed on Nov. 22, 2011, in 10 pages.
http://faculty.unlv.edu/jensen/gisdata/navteq/NAVTEQ_DIGI-TAL_MAP_OVERVIEW_DEVELOPER_GUIDE.pdf; NAVTEQ, published Apr. 9, 2007, in 38 pages.

* cited by examiner

*Primary Examiner* — Helal A Algahaim
*Assistant Examiner* — Nga X Nguyen
(74) *Attorney, Agent, or Firm* — Knobbe, Martens, Olson & Bear LLP

(57) ABSTRACT

Vehicle management systems and associated processes can determine and consider street classifications when selecting routes for fleet vehicles. In one embodiment, a system for calculating routes for a plurality of vehicles in a vehicle fleet includes a computer system. The computer system is configured to receive custom data to classify streets of a network of streets in a geographic region for use in calculating routes. Based at least in part on the received custom data, the computer system can calculate custom routes on the network of streets between waypoint locations. In addition, the computer system can determine a classification for each street of the network of streets based at least in part on the calculated custom routes. The classification can include a score indicative of a hierarchical ranking of each street for calculating routes for the fleet vehicles on the network of streets in the geographic region.

20 Claims, 11 Drawing Sheets

STREET CLASSIFICATION INPUTS

SELECT VEHICLE TYPE:
- ○ AUTOMOBILES
- ○ SEMI-TRAILER TRUCKS
- ○ HAZARDOUS WASTE TRUCKS

SELECT ROUTE OPTIMIZATION:
- ○ TIME OPTIMIZATION
- ○ FUEL OPTIMIZATION
- ○ DISTANCE OPTIMIZATION

SELECT ROUTE CONDITIONS TO AVOID:
- ○ TOLLS
- ○ FERRIES
- ○ BORDERS

SYSTEM FOR CLASSIFYING STREETS FOR VEHICLE NAVIGATION

RELATED APPLICATIONS

This application claims the benefit of priority under 35 U.S.C. §119(e) to U.S. Provisional Patent Application No. 61/596,538, filed on Feb. 8, 2012, entitled "VEHICLE FLEET ROUTING SYSTEM," which is hereby incorporated by reference in its entirety.

BACKGROUND

Route selection or optimization has applications in vehicle routing, printed wire circuit layout, chip design and layout, and biological activities. Trucking and other vehicle fleets, for instance, select vehicle routes to deliver goods to various destinations. Similarly, transportation companies route vehicles to pick up and drop off passengers. In addition to land-based vehicles, route selection can also be used for ship, airplane, and rail transport route scheduling.

A typical route selection problem is to reduce or minimize the distance traveled or time spent traveling. Route selection problems might consider such factors as a number of turns in a given route, a number of intersections, speed limits, bridge crossings, and the like. Algorithms modeled using concepts from graph theory are often used to select routes.

SUMMARY

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

In accordance with some embodiments, a system for calculating routes for a plurality of vehicles in a vehicle fleet can include a street classification module comprising computer hardware and a route calculation module. The street classification module can receive custom data to classify streets of a network of streets in a geographic region for the purpose of efficiently determining how to route a plurality of vehicles in a vehicle fleet. Based at least in part on the received custom data, the street classification module can calculate custom routes on the network of streets in the geographic region between waypoint locations. Further, the street classification module can determine a classification for each street of the network of streets in the geographic region based at least in part on the calculated custom routes and store the determined classifications in a computer database. The classification can include an assigned score indicative of a hierarchical ranking of each street for calculating routes for the plurality of vehicles in the vehicle fleet on the network of streets in the geographic region. The route calculation module can calculate a first route on the network of streets in the geographic region for a first vehicle of the plurality of vehicles in the vehicle fleet using the stored classifications in the computer database to exclude a set of streets of the network of streets from evaluation for inclusion in the first route. In addition, the route calculation module can output the first route to a navigation device associated with the first vehicle for presentation to a driver of the first vehicle.

The system of the preceding paragraph can include a combination of one or more of the following features: Each of the waypoint locations can comprise an intersection between two or more streets of the network of streets in the geographic region. The street classification module can calculate only one custom route between any two waypoint locations on the network of streets in the geographic region. Each custom route can comprise a starting waypoint location and an ending waypoint location, and the classification for each street of the network of streets in the geographic region can be determined based on a first distance from each street of each calculated route to the starting waypoint location of each calculated route and a second distance from each street of each calculated route to the ending waypoint location of each calculated route.

In some embodiments, a system for calculating routes for a plurality of vehicles in a vehicle fleet can include a computer system comprising computer hardware programmed to implement a street classification module. The street classification module can receive custom data to classify streets of a network of streets in a geographic region for use in calculating routes for a plurality of vehicles in a vehicle fleet. Based at least in part on the received custom data, the street classification module can calculate custom routes on the network of streets in the geographic region between waypoint locations. The street classification module can determine a classification for each street of the network of streets in the geographic region based at least in part on the calculated custom routes and store the determined classifications in a computer database. The classification can include a score indicative of a hierarchical ranking of each street for calculating routes for the plurality of vehicles in the vehicle fleet on the network of streets in the geographic region.

The system of the preceding paragraph can include a combination of one or more of the following features: Each custom route can comprise a starting waypoint location and an ending waypoint location, and the classification for each street of the network of streets in the geographic region can be determined based on a first distance from each street of each calculated route to the starting waypoint location of each calculated route and a second distance from each street of each calculated route to the ending waypoint location of each calculated route. The assigned score can be further indicative of the hierarchical ranking of each street for calculating routes of various lengths on the network of streets in the geographic region. The street classification module can classify each street of the network of streets into one group of a plurality of groups, where the streets of each group correspond to a common degree of importance for calculating routes of a common length range on the network of streets in the geographic region. The street classification module can calculate only one custom route between any two waypoint locations on the network of streets in the geographic region. Each of the waypoint locations can comprise an intersection between two or more streets of the network of streets in the geographic region. The custom data can comprise data input to a user interface of a fleet vehicle navigation system. The custom data can comprise an indication of a fleet vehicle type, and a first fleet vehicle type can result in different calculated custom routes and different determined classifications than the calculated custom routes and the determined classifications for a second fleet vehicle type; the first fleet vehicle type being different from the second fleet vehicle type. The custom data can comprise an indication of a route optimization approach, and the route optimization approach can comprise one of at least a time optimization approach, fuel optimization approach, or a distance optimization approach, wherein the street classification module can calculate the custom routes using the route optimization approach, and wherein the calculated custom routes and the determined classifications can vary depending in part on whether the indication of the route optimization approach corresponds to the time optimization approach, the fuel optimization approach, or the distance optimization approach. The custom data can comprise an indication of route conditions to avoid, and the route conditions can comprise one or more of at least tolls, ferries, and borders, wherein the street classification module can calculate the custom routes so as to avoid the route conditions, and wherein the calculated custom routes and the determined classifications can vary depending in part on whether the indication of the route conditions to avoid corresponds to tolls, ferries, or borders.

In accordance with some embodiments, non-transitory physical computer storage can include instructions stored thereon for implementing, in one or more processors, a method of managing routing calculations for a plurality of vehicles in a vehicle fleet. The method can include receiving a request to route a plurality of vehicles of a fleet of vehicles on a network of streets in a geographic region. Based on a characteristic of the request, a street classification data set can be accessed to classify the streets of the network of streets. The street classification data set may have been built using custom data and include scores indicative of a hierarchical ranking of each street for calculating routes for the plurality of vehicles in the vehicle fleet on the network of streets in the geographic region. In addition, routes can be calculated on the network of streets in the geographic region for the plurality of vehicles in the vehicle fleet using the street classifications to exclude a set of streets of the network of streets from evaluation for inclusion in one or more routes. The calculated routes can be output to navigation devices associated with the plurality of vehicles for presentation to drivers of the plurality of vehicles.

The non-transitory physical computer storage of the preceding paragraph can include a combination of one or more of the following features: The characteristic can comprise an indication of a fleet vehicle type, and wherein the accessed street classification data set and the excluded set of streets can be different for different fleet vehicle types. The characteristic can comprise an indication of a route optimization approach, and the route optimization approach can comprise one of at least a time optimization approach, fuel optimization approach, or a distance optimization approach, and wherein the accessed street classification data set and the excluded set of streets can vary depending in part on whether the indication of the route optimization approach corresponds to the time optimization approach, the fuel optimization approach, or the distance optimization approach. The characteristic can comprise an indication of route conditions to avoid, and the route conditions can comprise one or more of at least tolls, ferries, and borders, and wherein the accessed street classification data set and the excluded set of streets can vary depending in part on whether the indication of the route conditions to avoid corresponds to tolls, ferries, or borders. The street classification data set can be built at least partially using custom data provided by a transmitter of the request. The assigned score can be further indicative of the hierarchical ranking of each street for calculating routes of various lengths on the network of streets in the geographic region.

BRIEF DESCRIPTION OF THE DRAWINGS

The features of various embodiments disclosed herein are described below with reference to the drawings. Throughout the drawings, reference numbers are re-used to indicate correspondence between referenced elements. The drawings are provided to illustrate embodiments described herein and not to limit the scope thereof.

FIG. 10A illustrates an embodiment of a user interface display for receiving custom data inputs to classify streets.

DETAILED DESCRIPTION

I. Introduction

Street classification can be used to assist in selecting routes for fleet vehicles and provide a way to limit the number of links that may be considered for determining a route. Traditional functional hierarchy classifications (e.g., NAVTEQ's road classification) are one size fits all classifications, not customized to different customer fleets, and can be used with some success for routing fleet vehicles. These traditional functional hierarchy classifications, however, may provide less flexibility, accuracy, and control than may be desirable. For example, a traditional functional hierarchy classification can rank roundabouts and ramps as minor streets. When such a classification ranking is used in routing, streets such as roundabouts and ramps can be excluded as potential streets for use in a route since the roundabouts and ramps may be considered too minor for inclusion, missing potentially important route options for certain fleets.

Advantageously, this disclosure describes embodiments where custom classifications are determined for streets of a network of streets. The custom classifications can be determined based at least in part on one or more custom routes satisfying one or more constraints that are calculated on the network of streets. A score indicative of a hierarchical ranking, degree of importance, or suitability for each street to routes of various lengths can be determined using the custom routes and stored as a custom classification for each street. In turn, the custom classifications can be used to efficiently calculate routes for hundreds or thousands of vehicles of a fleet of vehicles in a short time. The custom classifications can provide indications of custom uses or values of streets for routing particular fleets of vehicles.

The features described herein may also be implemented for non-fleet vehicles, such as in personal vehicle navigation systems. However, for ease of illustration, the remainder of this disclosure will describe routing systems in the context of vehicle fleets, such as fleets of service vehicles, trucks, taxis, other transportation vehicles, emergency vehicles, and the like.

II. Vehicle Management System Overview

Figure 1:
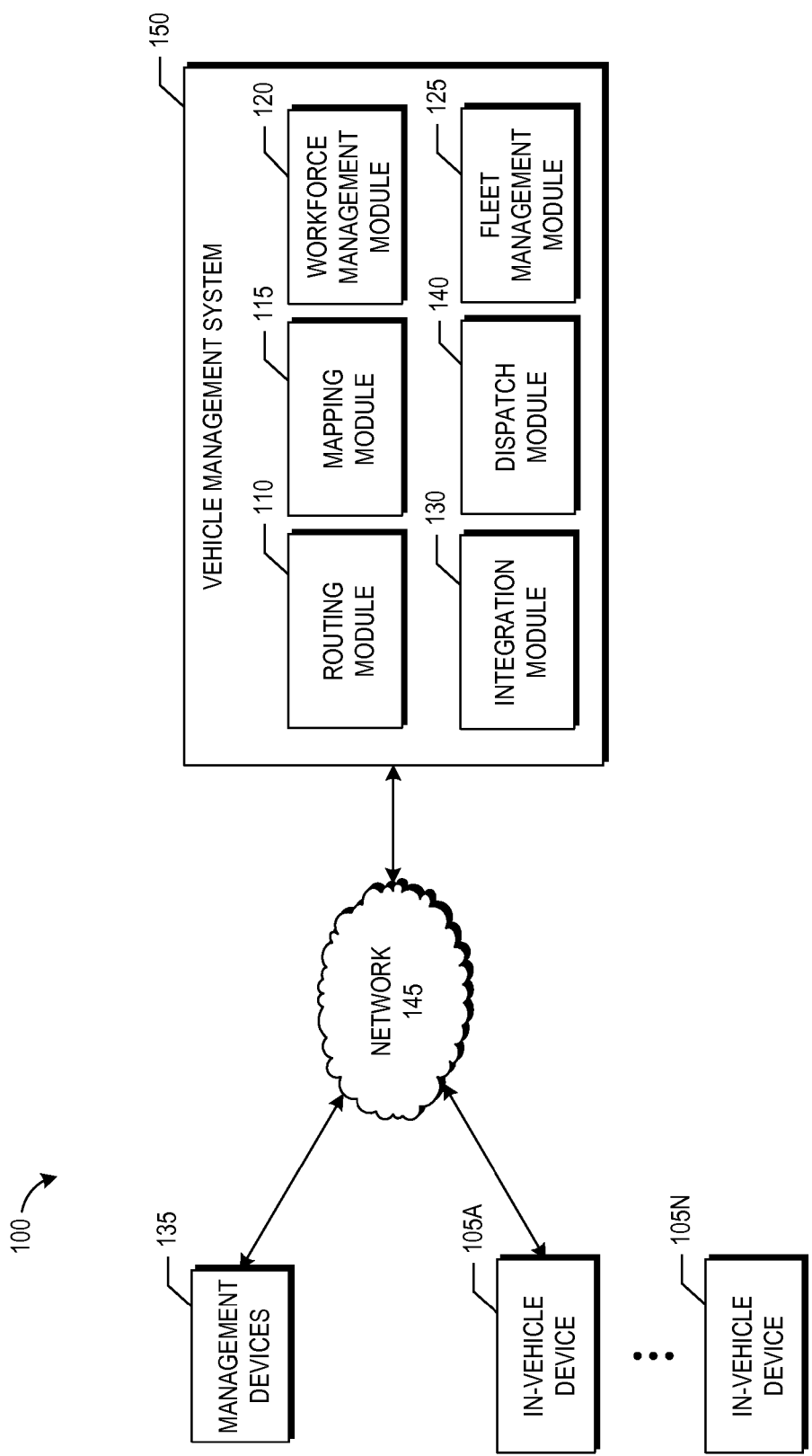
FIG. 1 illustrates an embodiment of a vehicle management system.

FIG. 1 illustrates an embodiment of a computing environment 100 for implementing an example vehicle management system 150. Among other features, the vehicle management system 150 can determine custom street classifications for streets of a network of streets and perform vehicle routing on the network of streets using the custom classifications.

In the computing environment 100, one or more in-vehicle devices 105A . . . 105N and management devices 135 communicate with the vehicle management system 150 over a network 145. The in-vehicle devices 105 can include computing devices installed in fleet vehicles. These devices 105 can include navigation functionality, routing functionality, and the like. The in-vehicle devices 105 can receive route information and other information from the vehicle management system 150. In addition, the in-vehicle devices 105 can report information to the vehicle management system 150, such as driver location, vehicle sensor data, vehicle status (e.g., maintenance, tire pressure, or the like), and so forth. Example user interfaces for in-vehicle devices 105 are described further below with respect to FIGS. 10A and 10B.

The management devices 135 can be computing devices used by dispatchers, fleet managers, administrators, or other users to manage different aspects of the vehicle management system 150. For example, a user of a management device 135 can access the vehicle management system 150 to generate routes, dispatch vehicles and drivers, and perform other individual vehicle or fleet management functions. With the management devices 135, users can access and monitor vehicle information obtained from one or more of the in-vehicle devices 105 by the vehicle management system 150. Such vehicle status information can include data on vehicle routes used, stops, speed, vehicle feature usage (such as power take-off device usage), driver behavior and performance, vehicle emissions, vehicle maintenance, energy usage, and the like. In some embodiments, the management devices 135 are in fixed locations, such as at a dispatch center. The management devices 135 can also be used by administrators in the field, and may include mobile devices, laptops, tablets, smartphones, personal digital assistants (PDAs), desktops, or the like. Example user interfaces for management devices 135 are described below in detail with respect to FIGS. 10A and 10B.

The vehicle management system 150 can be implemented by one or more physical computing devices, such as servers. These servers can be physically co-located or can be geographically separate, for example, in different data centers. In one embodiment, the vehicle management system 150 is implemented as a cloud computing application. For instance, the vehicle management system 150 can be a cloud-implemented platform hosted in one or more virtual servers and/or physical servers accessible to users over the Internet or other network 145. In the depicted embodiment, the vehicle management system 150 includes a routing module 110, a mapping module 115, a workforce management module 120, an integration module 130, a dispatch module 140, and a fleet management module 125. These components can, but need not, be integrated together on a common software or hardware platform.

The fleet management module 125 can include functionality for generating, rendering, or otherwise displaying a vehicle management user interface. The vehicle management user interface can include a map or list of vehicles that depicts symbols or other data representative of vehicles.

As used herein, the terms "output a user interface for presentation to a user," "presenting a user interface to a user," and the like, in addition to having their ordinary meaning, can also mean (among other things) transmitting user interface information over a network, such that a user device can actually display the user interface.

The fleet management module 125 can communicate with the mapping module 115 to obtain mapping data, which the fleet management module 125 can include in the vehicle management user interface. The mapping data can be compressed, transmitted, re-rendered, and displayed on the management user interface. Other data can also be overlaid to enhance the map and management layout. The mapping module 115 can be a geographic information system (GIS) in one embodiment. The fleet management module 125 can also access vehicle status data based on telematics data obtained from the in-vehicle devices 105N. The telematics data can include such data as location or speed information obtained using GPS or cellular tower triangulation (or other methods), vehicle sensor data, solid state inertial information, or any other data that can be obtained from a vehicle, its engine, or the like (including other sensors such as passenger seat sensors to detect the presence of passengers and so forth).

The routing module 110 can implement any of the routing features described above. In addition, the routing module 110 can construct pre-dispatch or post-dispatch routes for vehicles based on any of a variety of routing algorithms, such as those disclosed in U.S. Publication No. 2010/0153005, filed Dec. 8, 2009, and entitled "System and Method for Efficient Routing on a Network in the Presence of Multiple-Edge Restrictions and Other Constraints," the disclosure of which is hereby incorporated by reference in its entirety. The routing module 110 can automatically select routes that take into account factors that affect energy usage using the techniques described in U.S. Publication No. 2011/0238457, filed Nov. 24, 2010, and entitled "Vehicle Route Selection Based on Energy Usage," the disclosure of which is hereby incorporated by reference in its entirety. In addition, the routing module 110 can perform the street classification and routing processes discussed below in detail with respect to FIGS. 3, 4, 5, and 8.

The integration module 130 can facilitate integration of the vehicle management system 150 with other systems, such as fuel card systems, payroll systems, supply chain system, insurance systems, and the like. The dispatch module 140 can provide functionality for users of the management devices 135 to assign drivers and vehicles to routes selected by the routing module 110.

The illustrated network 145 may be a LAN, a WAN, the Internet, combinations of the same, or the like. For ease of illustration, the vehicle management system 150 has been depicted as a centralized system. However, in other implementations, at least some of the functionality of the vehicle management system 150 is implemented in other devices. Other possible implementations of the vehicle management system 150 can include many more or fewer components than those shown in FIG. 1.

III. Routing Module Embodiments

Figure 2:
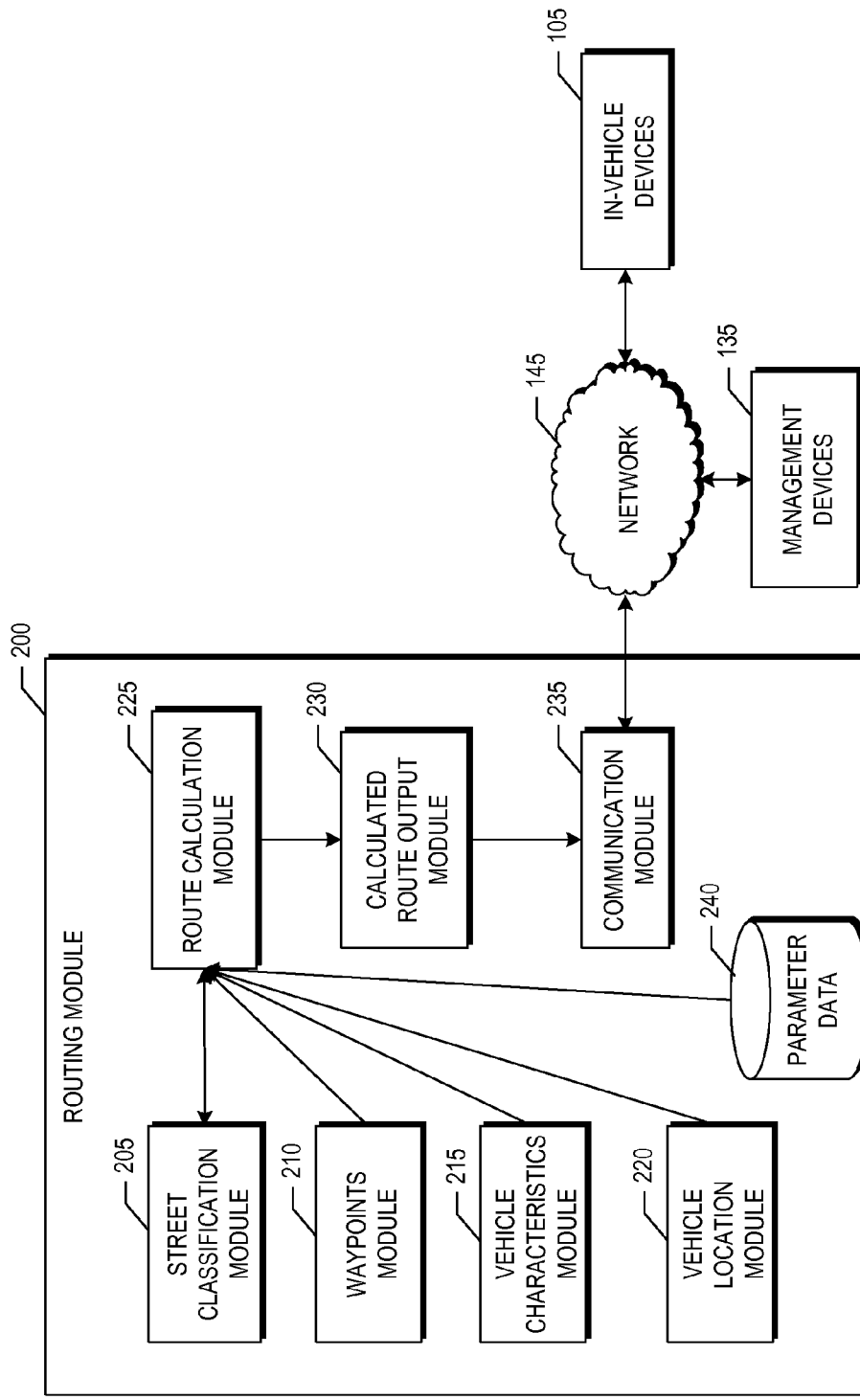
FIG. 2 illustrates an embodiment of a routing module usable with the system of FIG. 1.

Turning to FIG. 2, an embodiment of a routing module 200 is shown. The routing module 200 is a more detailed embodiment of the routing module 110 described above and includes all the features thereof. The routing module 200 can classify streets of a network of streets in a geographic region and use the street classifications to efficiently calculate routes for fleet vehicles on the network of streets. The management devices 135 and in-vehicle devices 105 of FIG. 1 are also shown communicating with the routing module 200 over the network 145.

In the depicted embodiment, the routing module 200 includes a street classification module 205, waypoints module 210, a vehicle characteristics module 215, a vehicle location module 220, a route calculation module 225, a calculated route output module 230, and a communication module 235. The routing module 200 can also include one or more parameter databases or data repositories 240 for storage of information regarding various road parameters, such as, but not limited to, speed limits, one-way vs. two-way information, traffic signal and traffic sign information (e.g., estimated wait times for different times of the day), road hazard or closure information, construction information, and traffic information (e.g., congestions, detours and accident), and the like.

The waypoints module 210 can access waypoint data useful for constructing a route. The waypoint data can include a starting location, a target or destination location, intermediate waypoint locations, landmarks, and the like. The starting and ending location as well as possibly other waypoints can be input by a user of a management device 135. At least some of the waypoints data can also be provided to the waypoints module 210 from the mapping module 115 described above.

The vehicle characteristics module 215 can store vehicle characteristics regarding vehicles in a fleet. These characteristics can be input by a user, for instance. The vehicle characteristics can include, but are not limited to, vehicle energy type based on energy consumption (e.g., gasoline-powered, electric, hybrid, or alternative fuel), vehicle class (e.g., passenger vehicle, commercial truck or trailer, bus), vehicle dimensions, vehicle weight (e.g., unloaded or loaded, estimated or actual), vehicle capacity, vehicle energy functions (e.g., energy regeneration capabilities, limitations on range), maintenance history, and the like.

The vehicle location module 220 can determine location information for each vehicle in the fleet. In one embodiment, this location information is multi-dimensional, such as three-dimensional. For example, the location information can include a latitude component, a longitude component, and an elevation component. The location information can be manually input by a user or can be automatically determined from Global Positioning System (GPS) functionality of the in-vehicle devices 105 or within a mobile device (e.g., a phone) carried by an operator of the vehicle.

The route calculation module 225 can determine one or more alternative feasible, or candidate, routes from a starting waypoint to a destination waypoint. The feasible routes can be determined using one or more initial searching algorithms based on one or more initial criteria, factors or variables (e.g., distance and/or estimated transit time) to trim down the search space to exclude unreasonable routes. The feasible routes can be determined based on input received from the waypoints module 210, the vehicle characteristics module 215, the vehicle location module 220, and/or the parameter database 240. In some embodiments, the route calculation module 225 determines custom routes between waypoint locations based on custom data. The custom routes can, in turn, be used by the street classification module 205 to classify streets of the custom routes for use in efficiently determining how to route fleet vehicles.

The route selection determination methods will be described in more detail below; however, any number of search algorithms or methods can be used without departing from the spirit and/or scope of the disclosure, including but not limited to, breadth-first algorithms, depth-first algorithms, best-first algorithms, Djikstra's algorithm, the Hungarian (Munkres) algorithm, the A* algorithm, Traveling Salesman-related algorithms, linear programming algorithms, and combinations or modifications of the same. Moreover, any number of data structures can be used to implement the algorithms (e.g., graphs, trees, heaps, stacks, queues, priority queues, combinations of the same, and/or the like). One example search algorithm used to generate feasible routes or optimal routes based on a cost function is described in U.S. Patent Application Publication No. 2010/0153005, filed on Dec. 8, 2009, the disclosure of which is hereby incorporated by reference in its entirety.

The street classification module 205 can determine street classifications at least in part based on custom routes calculated by the route calculation module 225. The street classification module 205 can receive custom routes calculated by the route calculation module 225 and analyze the custom routes to determine custom classifications, such as a score indicative of a hierarchical ranking, degree of importance, or suitability of streets for routing fleet vehicles. In some embodiments, the classification can be further based on spatial or topological relationships to other streets for routing, in addition to the class of the streets based on a street's federal or state highway status and the like, number of lanes, or other attributes of streets. The street classification module 205 can store the classifications in the parameter database 240 or outside the routing module 200 via storage connected to the network 145.

In addition, the route calculation module 225 can access and receive street classifications from the street classification module 205, the parameter database 240, or other storage connected to the network 145. The accessed and received street classifications can depend on a characteristic of a routing request (e.g., the fleet vehicle type to be routed, service level selected by the requestor, customer identification code, etc.) for a particular fleet of vehicles.

The route calculation module 225 can further use the street classifications to limit streets of the network that are considered for routing fleet vehicles. For instance, streets having a higher classification score indicative of a higher hierarchical ranking can be considered for longer distances or routes. On the other hand, streets having a classification score indicative of a lower hierarchical ranking can be considered for short distances or routes. In other embodiments, the route calculation module 225 can instead use the street classifications to weight the consideration of streets, determine degree of importance of streets, or predict function or uses of streets, among other possibilities.

The calculated route output module 230 can output the one or more routes identified by the route calculation module 225. The routes can be output to a vehicle-based display unit, a handheld mobile device, and/or to a remote location over the network 145 (e.g., the client computing device 135, the dispatch center 140). In some embodiments, the calculated route output module 230 can output feedback to a driver (e.g., directions, instructions, warnings, alerts, alarms). For example, the calculated route output module 230 can output a real-time suggested driving route modification based on traffic or weather conditions. The output feedback can include voice commands, audible alerts, and/or on-screen text or graphics. The feedback can advantageously change driver behavior to improve energy efficiency and reduce energy use. In some embodiments, the calculated route output module 230 is in communication with, and controls operation of, a display device and/or one or more audio devices.

In some embodiments, the calculated route output module 230 generates audible instructions or signals, thereby permitting a user of an in-vehicle device 105 to follow a route to a destination. Such signals may include, for example, beeps or tones that are generated when a driver approaches a pertinent intersection, or may include verbal directions, such as "turn left ahead." In some embodiments, the verbal directions are in a language the user understands, such as English or French, and the language can be changed by the user of the system based on their personal preferences. Further, in certain embodiments, the voice used to express the verbal directions can be changed without changing the language of the verbal directions.

The communication module 235 can facilitate communication by and with the routing module 200 over the network 145. In some embodiments, the communication module 235 receives data from the network 145 and transmits data to the management device 135 and to the in-vehicle devices 105. The communication module 235 can provide the route calculation module 225 with access to network resources or information databases, such as traffic and weather web sites, over the network 145.

The parameter database 240 can include one or more storage databases or other data repositories. In addition to storing the various road parameters described above, the parameter database can store any data that may be used to determine the costs of routes or portions of routes (e.g., legs). The parameter database 240 can be in communication with the route calculation module 225 and any of the other sub-modules of the routing module 200, such as the street classification module 205. In some embodiments, the parameter database 240 can be communicatively coupled to the network 145. As one example, the parameter database 240 can include look-up tables of information related to street classification data sets comprising street classifications. The look-up information can take characteristics of routing requests as inputs and enable look-ups of corresponding street classification data for use in routing calculations, for example. As another example, the parameter database 240 can store custom data as discussed in this disclosure for use in classifying streets.

In other embodiments, the parameter database(s) 240 or other data repositories can reside on the client computing device 135, at the dispatch center 140, within a vehicle 105, or at other remote locations communicatively coupled to the network 145.

IV. Overall Routing System Process

Figure 3:
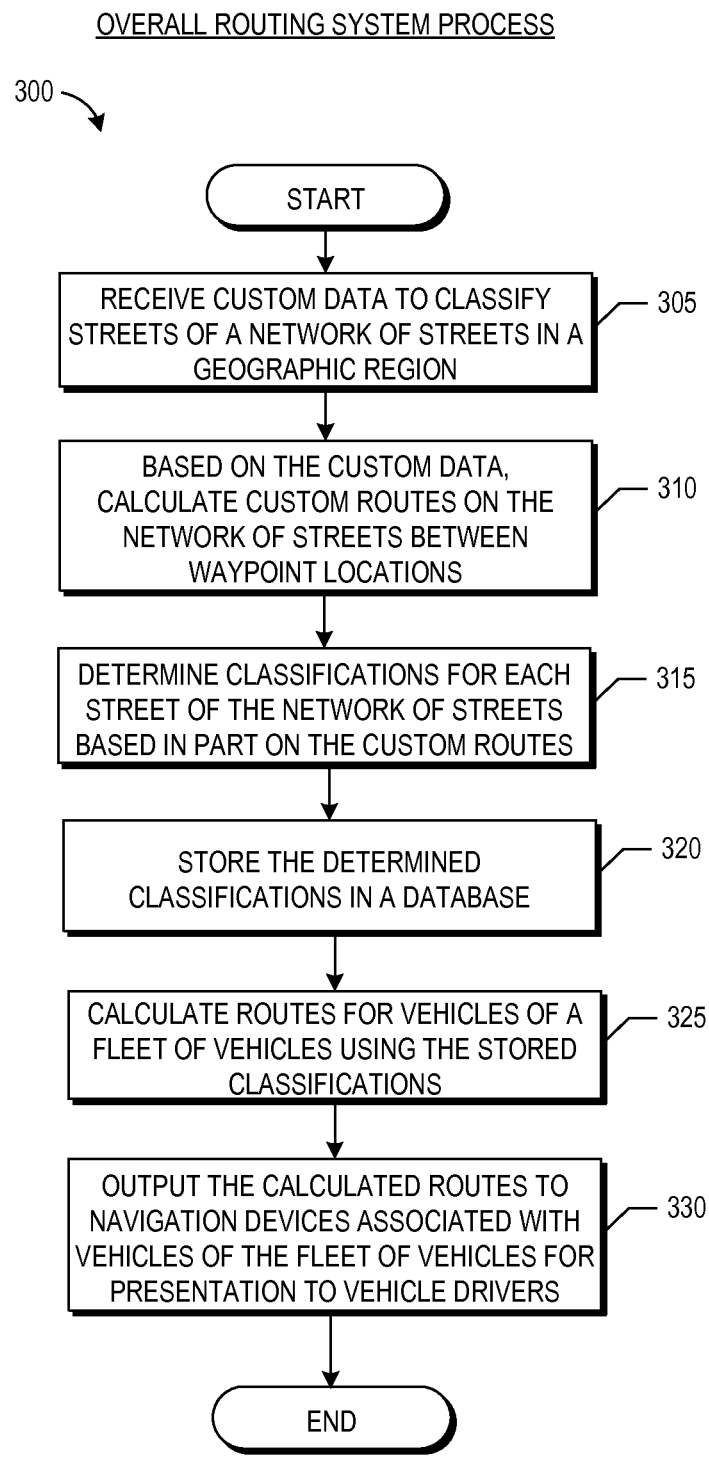
FIG. 3 illustrates an embodiment of an overall routing system process executable by the routing module of FIG. 2.

With reference to FIG. 3, an embodiment of an overall routing system process 300 executable by the routing module 200 is illustrated. In certain embodiments, the routing module 200 can determine a score indicative of a hierarchical ranking of streets in a network of streets in a region by calculating custom routes on network of streets. In some embodiments, the routing module 200 can exclude streets of network of streets from consideration for a route or portion of route based on the score or hierarchical ranking. As a result of trimming down the search space, the routing module 200 can perform faster calculation of routes and enable more direct and efficient determination of routes than using some other methods.

At block 305, the route calculation module 225 receives custom data to classify streets of a network of streets in a geographic region. The custom data can include navigation or routing data used to influence the classification of streets. The custom data can, for example, include physical or legal restrictions relating to vehicles types, street travel limits, route stop requirements, geography like hills and bridges, weight capacities of roads, weather imposed road limitations, traffic effects, and restrictions on transportation of dangerous substances, among other possibilities. Moreover, the custom data can include an indication of a type of fleet vehicle to be routed, such as an automobile, semi-trailer, or hazardous waste truck. In addition, the custom data can include an indication of a route optimization approach, such as time optimization, fuel optimization, or distance optimization. Further, the custom data can include an indication of route conditions to avoid, such as tolls, ferries, borders, or the like. In certain embodiments, the custom data is customized to different customers or users of the vehicle management system 150.

The custom data can be received from the parameter database 240 or over the network 145 from different devices, such as management devices 135 or in-vehicle devices 105. For example, the route calculation module 225 can receive from in-vehicle devices 105 an indication of the type of vehicle in which the in-vehicle devices 105 are installed and use the indication as part of the received custom data. In certain embodiments, the custom data can be initially provided by a manager of the routing module 200 or a route calculation request, and the custom data can then be supplemented or updated by the initial source or other providers of custom data.

At block 310, based on the custom data, custom routes are calculated on the network of streets between waypoint locations by the route calculation module 225. The route calculation module 225 can generate custom routes using one or more initial criteria, variables, or factors indicated by the custom data. In some embodiments, the custom data is used to influence the calculation of custom routes between sets of two waypoint locations on the network of streets. The custom routes can be generated using a route optimization approach indicated in the custom data. In some embodiments, the route calculation module 225 can utilize some custom data and disregard other custom data, and thereby increase the processing speed for determining the custom routes. Moreover, in certain embodiments, the custom routes are calculated for street classification purposes and not for navigation purposes.

At block 315, classifications for each street of the network of streets are determined based at least in part on the custom routes, for example, by the street classification module 205. The classifications for each street can include an assigned score indicative of a hierarchical ranking of streets of the custom routes for calculating routes of different lengths for fleet vehicles. Various approaches can be utilized to determine the classifications, for example, including determining distances between streets and waypoint locations of custom routes or a frequency of occurrences of streets in custom routes. In some embodiments, the classifications are determined for some streets of the network but not others. Such an approach can facilitate parallel processing in classifying streets or permit an update of classifications for only a portion of the network.

At block 320, the determined classifications are stored by the street classification module 205 in a database, such as the parameter database 240. The classifications can be stored using a look-up table or other storage approach to facilitate access of the classification data for use in calculating routes.

At block 325, the route calculation module 225 calculates routes for vehicles of a fleet of vehicles using the stored classifications. The route classification module 225 can initially access the classifications stored in the parameter database 240 and associate the classifications with the streets of the network. Further, the route classification module 225 can access the waypoints module 210 for waypoint data, including starting locations, target or destination locations, intermediate waypoint locations, landmarks, and the like for the routes. The vehicle characteristics module 215 can provide vehicle characteristics regarding vehicles in the fleet, and the vehicle location module 220 can determine location information for each vehicle in the fleet.

The route calculation module 225 can then generate feasible, or candidate, routes based one or more initial criteria, variables, or factors. For example, the feasible routes can be generated based on shortest distance or estimated transit time. Feasible routes can also include routes having a characteristic within a predefined percentage of the "best" route, such as a route having a time or distance within about 1%, within about 5%, or within about 10% of the calculated best route.

In some embodiments, the calculation of routes is performed using one or more other initial search algorithms to provide an initial reduction of the total number of possible routes to further trim down the search space. For example, the initial reduction can narrow down the possible routes to exclude highly improbable routes. The initial search algorithms can include, for example, Djikstra's algorithm, Munkres (Hungarian) algorithm, breadth-first algorithms, depth-first algorithms, best-first algorithms, and/or the like. In some embodiments, heuristic search techniques (such as A* search or other such techniques) can be implemented to narrow down the time and complexity of the search for routes.

At block 330, the calculated route output module 230 outputs calculated routes to navigation devices associated with vehicles of the fleet of vehicles for presentation to vehicle driver. The navigation devices for instance can include an in-vehicle device 105 or handheld mobile device of a driver, for instance.

V. Street Classification Processes

Figure 4:
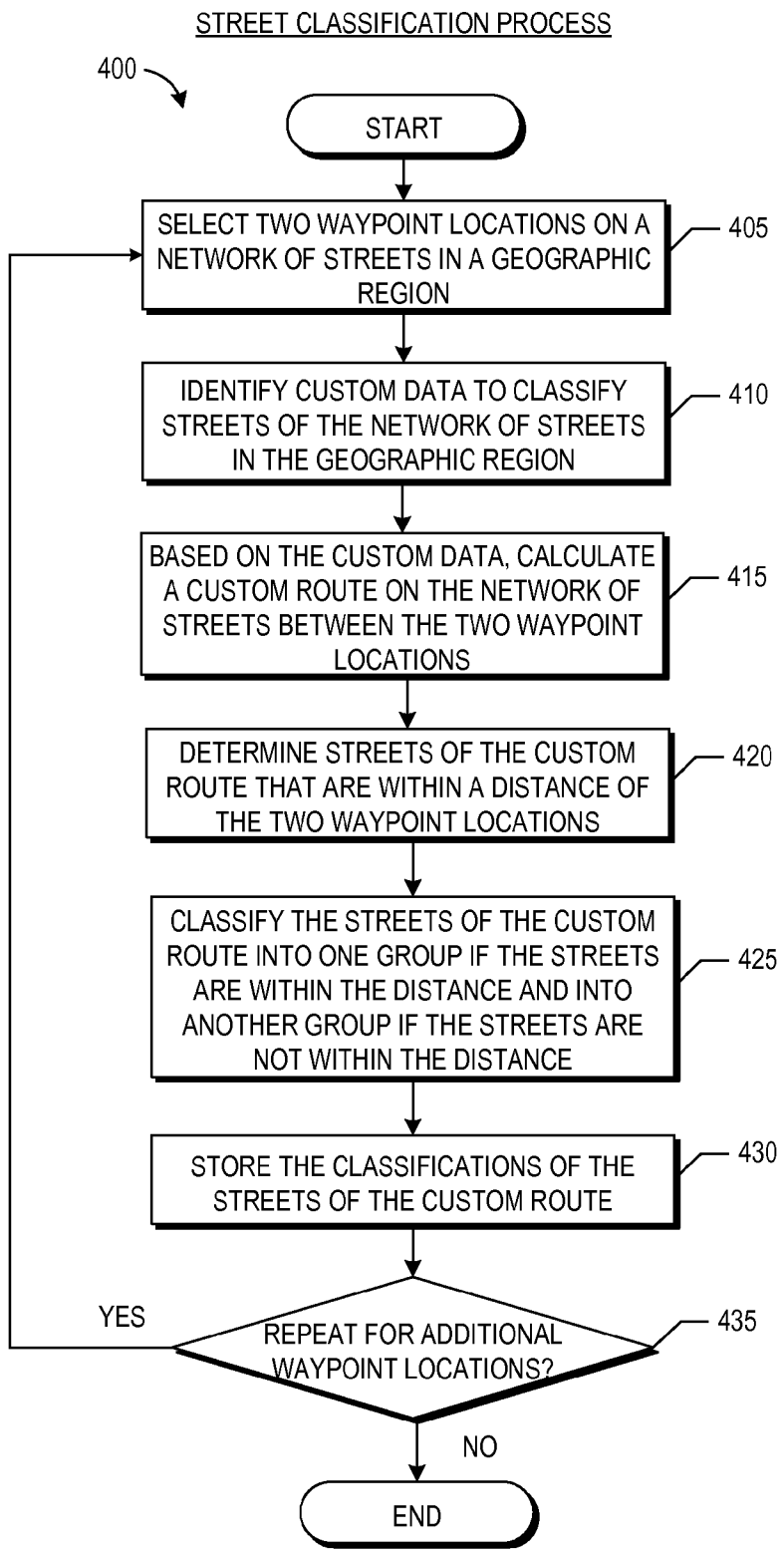
FIG. 4 illustrates an embodiment of a street classification process executable by the routing module of FIG. 2.

With reference to FIG. 4, an embodiment of a street classification process 400 executable by the routing module 200 is illustrated. In certain embodiments, the routing module 200 can determine a score indicative of a hierarchical ranking of streets in a network of streets in a region by calculating custom routes on network of streets. In particular, a distance from the streets of the custom routes to starting and ending waypoints of the custom routes can be used to classify streets according to the importance of streets to the routes of different lengths. Those streets be deemed important to multiple routes can be promoted to a higher importance classification, and those street deemed less important to multiple routes can be demoted to a lower importance classification.

At block 405, two waypoint locations on a network of streets in a geographic region are selected, for example, by the street classification module 205 or waypoints module 210. In certain embodiments, the waypoint locations can each include either intersections of two or more streets or ends of streets on the network of streets. The waypoint locations can be selected randomly or as part of a plan to select a sample or all combinations of two waypoint locations in the geographic region.

At block 410, the route calculation module 225 identifies custom data to classify streets of the network of streets in the geographic region. The custom data can include navigation or routing data, such as physical or legal restrictions in routing, used to influence the classification of streets. The custom data can be identified by the route calculation module 225 from the parameter database 240 or over the network 145 from other devices, such as management devices 135 or in-vehicle devices 105.

At block 415, based on the custom data, a custom route is calculated by the route calculation module 225 on the network of streets between the two waypoint locations. The route calculation module 225 can generate the custom route using one or more initial criteria, variables, or factors indicated by the custom data, such as a route optimization approach indicated in the custom data. In some embodiments, the custom data influences the calculation of custom routes between the two waypoint locations. The route calculation module 225 may utilize some custom data and disregard other custom data, and thereby increase the processing speed for determining the custom route in some instances. Moreover, in certain embodiments, the route calculation module 225 can calculate two or more routes between the two waypoint locations for use with blocks 415, 420, 425, and 430.

At block 420, the streets of the custom route that are within a distance of the two waypoint locations are determined, for instance, by the street classification module 205. In one embodiment, circles of a select radius can be placed at each of the two waypoint locations. The streets of the custom route that are within the circle are determined to be within the distance of the two waypoint locations. The circles can have radii of 1 mile, 5 miles, 20 miles, or 50 miles, or other values, and the radius of the circles can correspond to an assigned score, hierarchical ranking, or route class level for the streets determined to be within or outside the distance of the two waypoint locations. In some embodiments, shapes such as squares, rectangles, or ellipses can be used along with or instead of circles to determine which streets of the custom route are within the distance.

At block 425, the streets of the custom route are classified into one group by the street classification module 205 if the streets are within the distance and into another group if the streets are not within the distance. The streets outside the circles can be classified as likely important and assigned a higher score indicative of a greater usefulness for calculating routes of longer lengths. For example, the streets that are outside the circles can be classified as route class RC4. The streets inside the circles can be classified as likely less important with a lower assigned score and classification, such as route class RC5.

At block 430, the classifications of the streets of the custom route are stored by the street classification module 205 in a database, such as the parameter database 240. The classifications can be stored using a look-up table or other storage approach to facilitate access of the classification data for use in calculating routes. If the streets have been previously classified, former classifications can be replaced with the new classifications or replacement of former classifications may be delayed pending satisfaction of other conditions.

At block 435, the street classification process 400 determines whether to repeat blocks 405 through 430 for additional waypoint locations. In some embodiments, the street classification process 400 selects one of the two initial waypoint locations and queries the network of streets for other waypoint locations. The network may be queried for a distance of two times the radius of the placed circles in block 420 plus a maximum street length on the network or from the selected initial waypoint location. Blocks 405 through 430 can then be repeated for the selected initial waypoint location and a sample of (e.g., 10%, 20%, or 40% of the total number of waypoint locations) or all other waypoint locations on the network of streets. A common distance from the waypoints (e.g., circles having a common size) can be used for each performance of blocks 420 and 425.

Further, blocks 405 through 430 can be repeated for a sample of (e.g., 10%, 20%, or 40% of the total number of waypoint locations) or all other waypoint locations on the network of streets and a sample of (e.g., 10%, 20%, or 40% of the total number of waypoint locations) or all other waypoint locations on the network of streets. A common distance from the waypoints (e.g., circles having a common size) can be used for each performance of blocks 420 and 425. Upon the conclusion of the street classification process 400, the street classification module 205 can classify some or all streets of the network into one of two route classes.

In some embodiments, the street classification process 400 can be performed periodically (e.g., daily, weekly, monthly) or non-periodically (e.g., based on triggering events, such as an import process, new routing requests, or newly available map data).

Advantageously, in certain embodiments, the street classification process 400 can support parallel processing of the network of streets when determining street classifications. For instance, different regions of a network can be classified by different processors or servers. The street classification results from each processor or server can be combined to form a complete street classification data set.

In other embodiments, various modifications or changes can be made to the street classification process 400 described above. For example, in one embodiment, the street classification process 400 can classify streets using custom routes having waypoint locations closest to the edge or border of the network first. The streets classified initially as having a higher score and hierarchical ranking may be excluded from additional reclassification to decrease processing time. Alternatively, in another embodiment, the street classification process 400 classifies streets using custom routes having waypoint locations closest to the center of the network first.

In some embodiments, the number of waypoint locations sampled for the street classification process 400 varies or is selected at least in part based on the density of streets in an area of the network. A greater density of streets can advantageously result in less sampling in certain cases since many waypoint locations in greater street density areas may result in similar custom routes and negligibly influence determined street classifications. As one example, fewer streets can be sampled in urban areas where the density of streets may be greater than in rural areas where the density of streets may be lower. In other embodiments, only waypoint locations visited by particular fleet vehicles on routes are sampled to classify the streets of the network.

In addition, in some embodiments, the streets of the custom routes can be classified into more than two groups or route classes based on the distance from the two waypoints to the streets. For example, circles having different radii can be placed at the two waypoint locations. The radius of each circle can correspond to a score indicative of a hierarchical ranking for the streets within or outside the circles. As one example, streets within a 5 mile radius can be classified as route class RC5; streets within a 20 mile radius can be classified as route class RC4; streets within a 50 mile radius can be classified as route class RC3; streets within a 100 mile radius can be classified as route class RC2; and, streets within a 200 mile major radius ellipse can be classified as route class RC1.

In some embodiments, the street classification process 400 can classify streets of the network based on a frequency of occurrence of streets in the custom routes. Various approaches can be used to determine, store, and encode the classification to minimize data stored when counting the frequency of the streets. For example, sampling can be used to reduce the number of routes and streets that may be counted. Additionally, decay can be introduced to the frequency count so that the counts reduce for streets that have not been counted recently by the street classification module 205.

Figure 5:
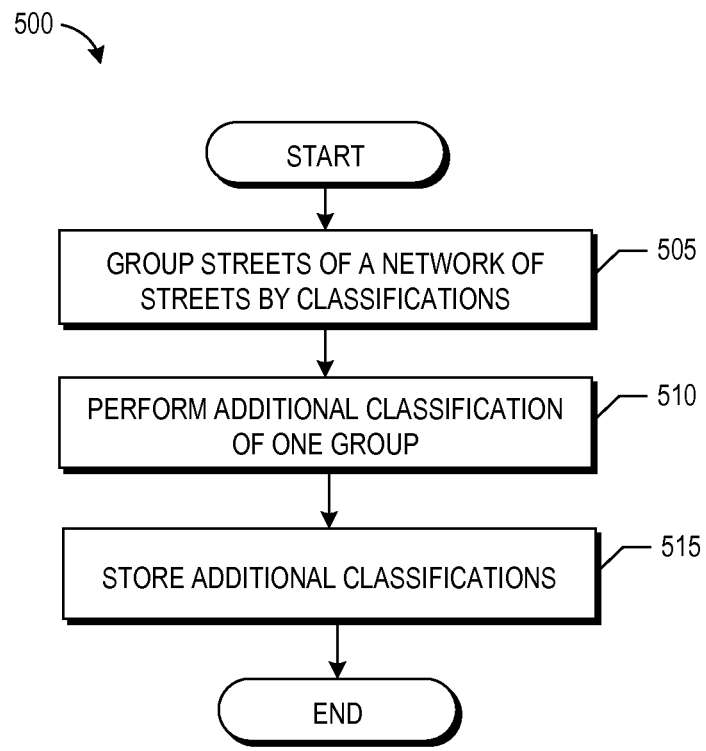
FIG. 5 illustrates an embodiment of a refining street classifications process executable by the routing module of FIG. 2.

Turning to FIG. 5, an embodiment of a refining street classifications process 500 executable by the routing module 200 is illustrated. In certain embodiments, the routing module 200 refines a score indicative of a hierarchical ranking of streets for calculating routes for fleet vehicles on the network. In particular, the routing module 200 can further classify previously classified groups or route classes.

At block 505, the streets of a network of streets are grouped by classifications. For example, the street classification process 400 may have previously classified the network of streets into streets having a route class RC4 or RC5. Those streets having the classification RC4 can be selected and grouped into a network of route class RC4 streets for further classification.

At block 510, additional classification is performed for one classification group using the street classification process 400, for instance. Continuing the example of block 505, additional classification can be performed using the network of route class RC4 streets, and the street classification process 400 can be performed treating only the streets of route class RC4 streets as the routable network. In addition, the required distance from streets of custom routes to the two waypoints can now be increased for determining which streets to promote to a higher hierarchical ranking of route class RC3. For example, if circles having a radius of 1 mile (R5) were placed for a first classification process between route classes RC5 and RC4. For promoting to a higher classification, circles having a radius of 5 miles (R4) can be placed for a second classification process between route classes RC4 and RC3. Furthermore, when the street classification process 400 queries the network of streets for waypoint locations, the network may now be queried for a distance equal to $2(R4-R5)+\text{link}_{max}$, where R4 and R5 represent the radii of the circles placed for route classes RC4 and RC5, respectively, and $\text{link}_{max}$ represents a maximum street length on the route class RC4 network or from a selected waypoint location. In some embodiments, the additional classification can be performed using more than one classification group, such as by performing the additional classification using more than one route class or the entire original routable network.

At block 515, the additional classifications are stored in a database, such as the parameter database 240. The classifications can be stored using a look-up table or other storage approach to facilitate access of the classification data for use in calculating routes. Former classifications can be replaced with the new classifications in some embodiments, or replacement of the former classifications can be delayed pending satisfaction of other conditions in other embodiments.

In certain embodiments, street links can be categorized into a plurality of route classes. For example, a set of route classes can include five classes: RC1 for major highways, RC2 for highways, RC3 for secondary highways, RC4 for arterial roads, and RC5 for surface roads. The route classes can correspond to the radius of the circle or shape used to determine the classification and correspond to assigned scores indicative of the hierarchical ranking of each street for calculating routes of various length ranges on the network of streets. RC5 can correspond to a circle with a radius of 5 miles and scores indicative of a greater degree of importance for shorter distance routes. RC4 can correspond to a circle with a radius of 20 miles and scores indicative of a greater degree of importance for longer routes than RC5 but a lesser degree of importance for shorter routes than RC3. While these distance values and route class designations are provided as examples, other values and designations can be chosen. In other embodiments, streets can be categorized into fewer or more than five classes.

As one example classification, a process similar to the street classification process 400 and the refining street classifications process 500 was performed for streets of a map file for the country of Luxembourg. The map file contained 47,708 intersections and 106,926 unidirectional street links. Street classifications were determined for streets based on a 1 mile radius (route class RC3), a 5 mile radius (route class RC2), and a 20 mile radius (route class RC1) from waypoint locations. From the total 106,926 unidirectional street links, 43,147 street links were classified as RC3, 19,160 street links were classified as RC2, and 622 street links were classified as RC1.

VI. Street Classification Examples

Figure 6:
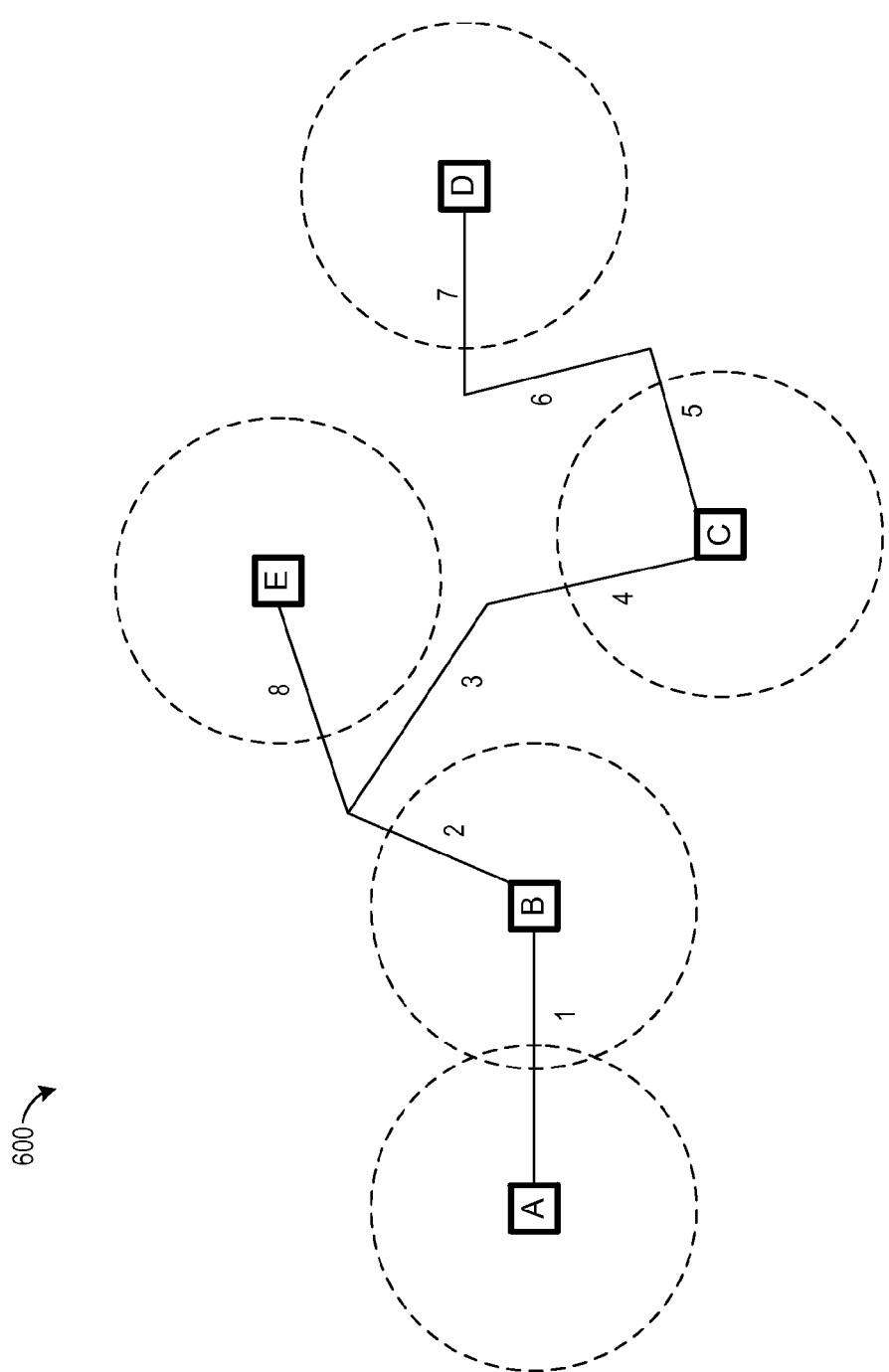
FIG. 6 illustrates a simplified graph diagram for a network of streets connecting various locations.

FIG. 6 illustrates a simplified graph diagram 600 for a network of streets connecting various locations that helps to illustrate the street classification process 400. Letters A through E represent waypoint locations on the network of streets. Numbers 1 through 8 represent street links of routes calculated from the waypoint location A to the waypoint locations B through E. The routes were calculated using custom data, for example, that caused to routes to optimize for shortest distance routes between waypoint locations for a semi-trailer truck. Based on the calculated routes, the street links 1 through 8 can be classified into one of two route classes RC1 and RC2.

In this example, the streets of the custom routes are classified based on a distance from street links to the starting and ending waypoint locations of each custom route. Circles having a set radius can be placed and centered at each waypoint location. The circles for instance may be circles having radius of 1 mile, 5 miles, 20 miles, or 50 miles, for example. The street links that are within the circles at the starting and ending waypoint locations of the routes can be classified to have a low assigned score corresponding to a route class RC2. On the other hand, the street links that are not within the radius of the circles at the starting and ending waypoint locations of the routes can be classified to have a high assigned score corresponding to a route class RC1. The route class RC1 can be more important street links for routes of longer lengths than routes of the route class RC2.

First, the route from waypoint location A to waypoint location B can be examined. Link 1 is the only link connecting waypoint location A to waypoint location B. As can be seen, link 1 is within the circles around waypoint location A and waypoint location B. As a result, link 1 can be classified as route class RC2.

Next, the route from waypoint location A to waypoint location C can be examined. Links 1 through 4 are the only links connecting waypoint location A to waypoint location C. Links 1 and 4 are within the circles around waypoint location A and waypoint location C, respectively, and can be reclassified or classified as route class RC2. Alternatively, links 2 and 3 are outside both circles around waypoint location A and waypoint location C and can be classified as route class RC1.

In addition, the route from waypoint location A to waypoint location D can be examined. Links 1 through 7 are the links connecting waypoint location A to waypoint location D. Links 1 and 7 are within the circles around waypoint location A and waypoint location D, respectively, and can be reclassified or classified as route class RC2. On the other hand, links 2 through 6 are outside both circles around waypoint location A and waypoint location D and can be reclassified or classified as route class RC1.

The route from waypoint location A to waypoint location E can also be examined. Links 1, 2, 8 are the only links connecting waypoint location A to waypoint location E. Links 1 and 8 are within the circles around waypoint location A and waypoint location E, respectively, and can be reclassified or classified as route class RC2. On the other hand, link 2 is outside both circles around waypoint location A and waypoint location E and can be reclassified as route class RC1.

In summary, links 1, 7, 8 can be classified as route class RC2 and have low assigned scores indicative of less important street links for routes of longer lengths than street links of route class RC1. Links 1, 7, 8 can together comprise a network of route class RC2 street links. On the other hand, links 2 through 6 can be classified as route class RC1 and have high assigned scores indicative of more important street links for longer length routes than routes of route class RC2. Links 2 through 6 can together comprise a network of route class RC1 street links.

After classification into route classes RC1 and RC2, the route classes can be further divided into additional route classes as discussed with respect to the refining street classifications process 500. For instance, additional custom routes can be calculated on the network comprising street links of route class RC1. Some route class RC1 street links may be promoted to a higher classification while other street links may remain route class RC1.

Figure 7A:
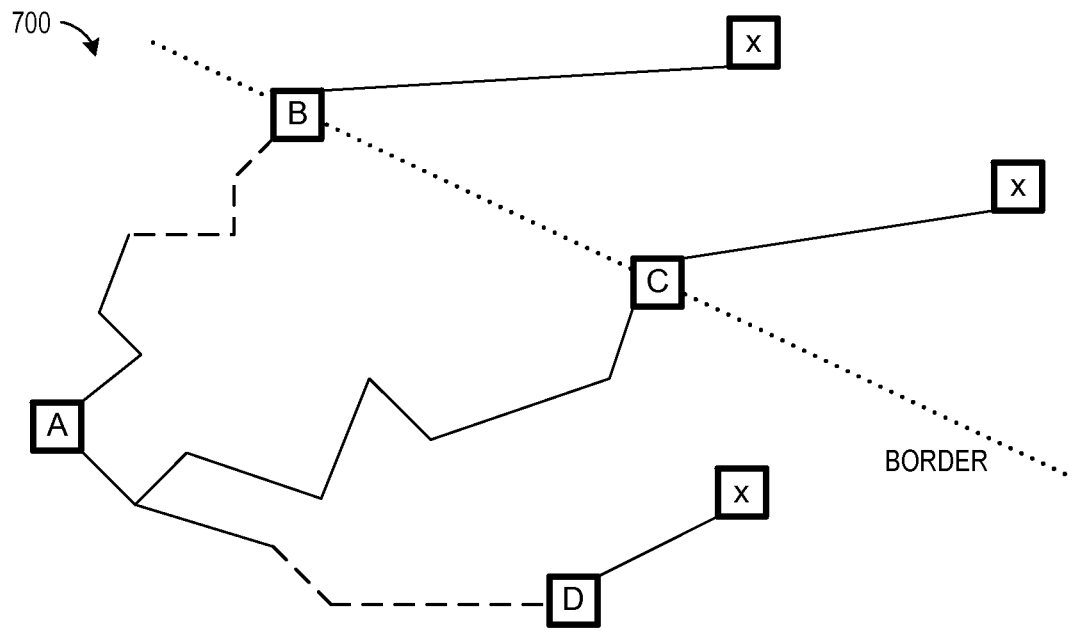
FIGS. 7A and 7B illustrate a simplified graph diagram for a network of streets connecting various locations near a border.

FIG. 7A illustrates a simplified graph diagram 700 of a network of streets connecting locations near a border that helps to illustrate another street classification process. Borders can occur where map files are created for a single geographic area, yet the streets of the map files can connect and border other neighboring networks of streets not be included in the map file. In addition, borders can occur where map files for different sections of a geographic area are released at different times, so the streets of some sections may not be available for classification at any one time. As a result, the routing module 200 may have limited or incomplete information to classify streets near borders when relying solely on custom routes on the network of streets.

The routing module 200 can address issues from classifying streets near borders utilizing one or more approaches or combinations of approaches. In some embodiments, the routing module 200 determines streets that appear to end near the edge of the network and decides whether to assign higher classifications based on one or more factors that suggest an unexpectedly low classification of the streets. Factors such as the type of neighboring streets (e.g., street classification or apparent function), closeness of neighboring streets, and density of neighboring streets can be considered. In addition, factors such as whether a high classification street abruptly ends near a border or whether functional classification data (e.g., street data provided by NAVTEQ) suggests that the street may be a major street or border crossing can be considered. In the illustrated example of FIG. 7A, the streets denoted with dashed lines connecting waypoint locations A to B and D may have been assigned a higher classification based on one or more of the above factors. Alternatively, the streets denoted with solid lines connecting waypoint locations A to C may have been assigned a lower classification based on one or more of the above factors.

Figure 7B:
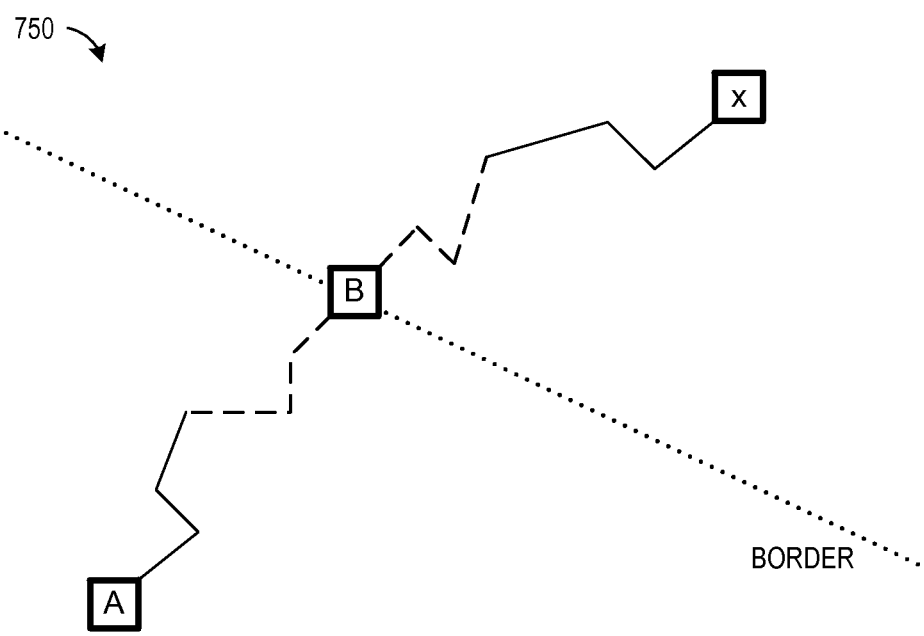

FIG. 7B illustrates a simplified graph diagram 750 of a network of streets connecting locations near a border that helps to illustrate an additional street classification process. As discussed with respect to FIG. 7A, the routing module 200 may have limited or incomplete information to classify streets near borders when relying solely on custom routes on the network of streets. As a result, in certain embodiments, the routing module 200 generates additional custom routes to classify the streets by assuming that borders are planes of reflection. This assumption enables the calculation of custom routes across borders and potentially improved classification of streets near borders. In the illustrated example, the streets denoted with dashed lines may have been assigned a higher classification by assuming that a waypoint location X exists as across the border.

VII. Street Classification Use Process

Figure 8:
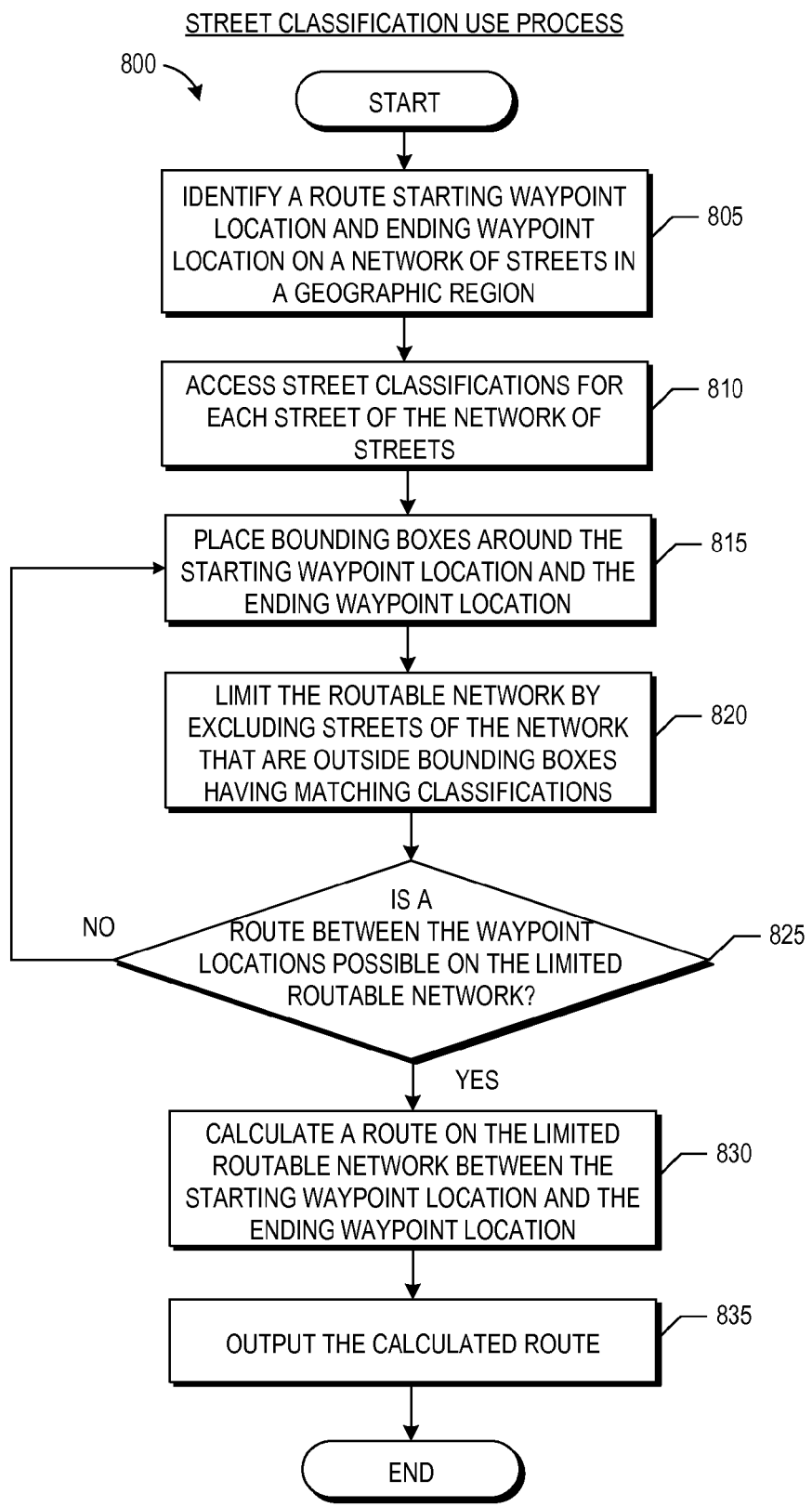
FIG. 8 illustrates an embodiment of a street classification use process executable by the routing module of FIG. 2.

With reference to FIG. 8, an embodiment of a street classification use process 800 executable by the routing module 200 is illustrated. In certain embodiments, the routing module 200 can limit streets of a network of streets that are considered for routing based on street classifications. Thereby, the routing module 200 can perform faster calculations of routes and enable more direct and efficient determination of routes than using some other methods.

At block 805, a route starting waypoint location and ending waypoint location on a network of streets are identified, for example, by the waypoints module 210. The waypoint locations can be received in real time via manual entry by a user or can be retrieved from a waypoints database or the like. In one embodiment, the starting waypoint is a vehicle's current location, which may be provided to the waypoints module 205 by an in-vehicle device 105. The starting waypoint and the destination waypoint can be the same (e.g., a round trip route), but need not be. In some embodiments, the starting and ending waypoint locations can be identified in response to receiving a request to route a plurality of vehicles of a fleet of vehicles. In certain embodiments, the waypoint locations can each include either intersections of two or more streets, ends of streets on the network of streets, or route stops for fleet vehicles.

At block 810, street classifications are accessed for the streets of the network of streets by the route calculation module 225. The accessed street classifications can be retrieved from the parameter database 240, which can include look-up tables of information related to street classification data sets. The look-up process can be performed using characteristics of routing requests that correspond to different street classification data sets for use in different routing calculations. For example, a route request may request routes for a fleet of semi-trailer trucks while indicating that travel costs should be minimized. The look-up tables can accordingly be used to select classifications determined based on custom routes for semi-trailer trucks according to a fuel optimized routing. In other embodiments, the look-up process can be performed by using other information such as vehicle characteristics for vehicles in a fleet received from the vehicle characteristics module 215.

At block 815, the route calculation module 225 can place bounding boxes around the starting waypoint location and ending waypoint location for the route. The bounding boxes can be placed in various positions relative to the waypoint locations, including centered over the waypoint locations or so that the waypoint locations are near a corner of the bounding boxes. In certain embodiments, the size of each bounding box corresponds to a particular street classification, such as a particular route class.

At block 820, the route calculation module 225 can limit the routable network by excluding streets of the network that are entirely or partly outside of bounding boxes with matching classifications. For example, the streets outside of bounding boxes having matching classifications can be considered unsuitable for use outside the area covered by bounding boxes. In particular, based on the location of each street, the route calculation module 225 can determine a limited routable network comprising the network of streets excluding the streets that are outside of bounding boxes with matching classifications.

At block 825, the street classification use process 800 determines whether a route between the starting waypoint location and the ending waypoint location is possible on the limited routable network. If no route is possible between the waypoint locations, the process 800 moves back to block 815 and the size or location of the bounding boxes is varied. On the other hand, if at least one route is possible between the waypoint locations, the process 800 moves to block 830.

At block 830, a route is calculated on the limited routable network between the starting waypoint location and the ending waypoint location using the route classification module 225. The route calculation module 225 can generate feasible, or candidate, routes based one or more initial criteria, variables, or factors. For example, the feasible routes can be generated based on shortest distance or estimated transit time. Feasible routes can also include routes having a characteristic within a predefined percentage of the "best" route, such as a route having a time or distance within about 1%, within about 5%, or within about 10% of the calculated best route.

In some embodiments, the determination of routes can be performed using one or more other initial search algorithms to provide an initial reduction of the total number of possible routes to further trim down the search space. For example, the initial reduction can narrow down the possible routes to exclude highly improbable routes. The initial search algorithms can include, for example, Djikstra's algorithm, Munkres (Hungarian) algorithm, breadth-first algorithms, depth-first algorithms, best-first algorithms, and/or the like. In some embodiments, heuristic search techniques (such as A* search or other such techniques) can be implemented to narrow down the time and complexity of the search for routes.

At block 835, the calculated route is output. The calculated routes can be output to navigation devices associated with vehicles of the fleet of vehicles for presentation to vehicle driver. The navigation devices for instance can include an in-vehicle device 105 or handheld mobile device of a driver, for instance.

In certain embodiments, the route calculation module 225 can use particular street link classifications (e.g., shortest route street link classification) in combination with other street link classifications (e.g., scenic route street link classification) or traditional functional hierarchy classifications (e.g., NAVTEQ's road classification) to determine a route. The different street link classifications can, for instance, be weighted to determine an overall street link classification value for use in the route calculation. Alternatively or additionally, separate routes can be run using the different street link classifications, and the routes can be compared to determine a final route. Further, custom routes can be processed based on round trip approaches to consider impact of unidirectional routing on street classifications. The influence of traveling each direction of the roundtrip can also be considered in the classification using a weighted average, for example.

VIII. Street Classification Use Example

Figure 9:
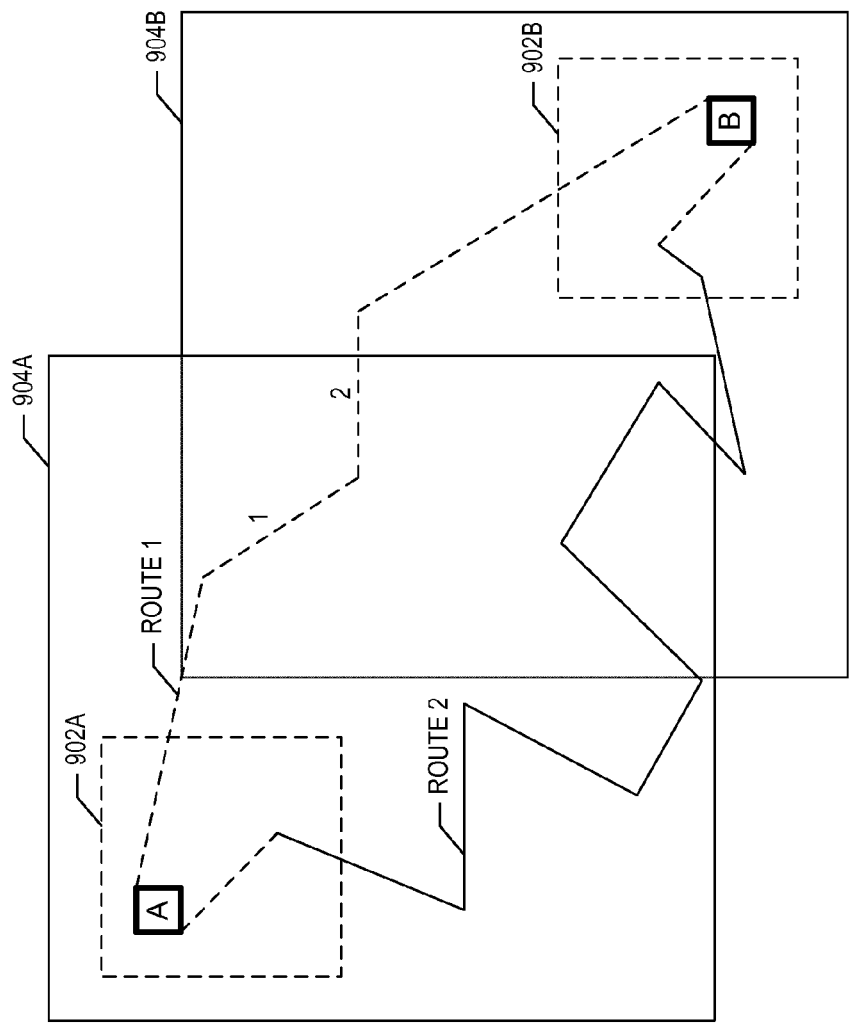
FIG. 9 illustrates a simplified graph diagram for a network of streets connecting two locations.

FIG. 9 illustrates a simplified graph diagram 900 for a network of streets connecting two locations that helps to illustrate the street classification use process 800. Letters A and B represent waypoint locations on the network of streets, such as the starting and ending waypoint locations of a route. The street links of Route 1 and Route 2 comprise the entire routable network between the waypoint locations A and B in the depicted embodiment.

Four bounding boxes are shown placed on the routable network of the simplified graph diagram 900. Bounding boxes 902A and 904A are shown placed so that the waypoint location A is located near the upper-left corner of both bounding boxes. Bounding boxes 902B and 904B are shown placed so that the waypoint location B is located near the lower-right corner of both bounding boxes.

Street classifications have been accessed from a database, such as the parameter database 240, and have been associated with the street links of the network and the four bounding boxes. Dashed lines can denote street links and bounding boxes corresponding to a classification of route class RC2, for instance, and solid lines can denote street links and bounding boxes corresponding to a classification of route class RC1. The streets classified as route class RC1 can represent streets that are a more important for routes of longer lengths than routes of route class RC2. In some embodiments, streets links are considered for routing when the street links are located entirely or partly within bounding boxes having a matching classification or routing class. If the street links are not located entirely or partly within bounding boxes having a matching routing class to the street links, the street links can be excluded from consideration for routing.

In the illustrated example, the street links of Route 1 and Route 2 provide two complete routes to travel from the waypoint location A to the waypoint location B. As can be seen, street links 1 and 2 of Route 1 are not within either bounding box 902A or 902B, which have a matching route class of RC2 to the street links 1 and 2. The other street links of the network are within bounding boxes having a matching route class. As a result, street links 1 and 2 can be excluded from consideration for routing while the other street links may be considered. Since Route 1 no longer provides a complete path to travel from waypoint locations A to B without street links 1 and 2, Route 2 can be selected for routing.

The simplified graph diagram 900 of FIG. 9 can further help illustrate advantageous features of the street link classification process 400, in certain embodiments, over traditional functional hierarchy classifications. For instance, the street classifications described in the illustrated example may have been provided from a traditional functional hierarchy classification source. The classification for each street link may have depended on characteristics of each street link, such as the number of lanes of the street link or the speed or amount of traffic that travels on the street link, rather than the importance of the street links to routes of various lengths. Consequently, Route 2 can be selected for routing as explained above. However, using the street link classification process 400, one or more street links of Route 1 may have been classified as route class RC1 rather than route class RC2 as classified by the traditional functional hierarchy classification source. As a result, the street links of Route 1 may not have been excluded based on the bounding boxes, and in certain embodiments a more direct or faster Route 1 can be selected for routing.

IX. Management and in-Vehicle Device User Interfaces

Turning to FIG. 10A, an embodiment of a user interface 1000 for receiving custom data inputs to classify streets is illustrated. In certain embodiments, the custom data used to classify streets of a network of streets can be input by a user of a navigation system through the user interface 1000. The user interface 100 can enable a user to select characteristics of routing requests for use in accessing an appropriate street classification data set for calculating routes. For example, a user can select a vehicle type for a fleet of vehicles, including routing automobiles, semi-trailer trucks, and hazardous waste trucks. In addition, a user can select from route optimization approaches, such as time, fuel, and distance optimization, or from route conditions to avoid, such as tolls, ferries, and borders, or the like. These selections can in turn be used by the route calculation module 225 to access the appropriate street classification data set for efficiently determining how to route the fleet of vehicles. Instead of or in addition to a user interface in some embodiments, the custom data used to classify streets of a network of streets can be provided by an application program interface (API), configuration file, in-vehicle devices 105, or other means, for example.

The user interface 1000 can include, but is not limited to, an LCD display, a heads-up display, an LED display, a 2D display, and/or a 3D display to instruct a user of the system which way to travel. In some embodiments, the screen is interactive. In some embodiments, the routing module 200 and the user interface 1000 are integrated into a vehicle navigation system or similar system, such as the in-vehicle devices 105 and management devices 135.

Figure 10B:
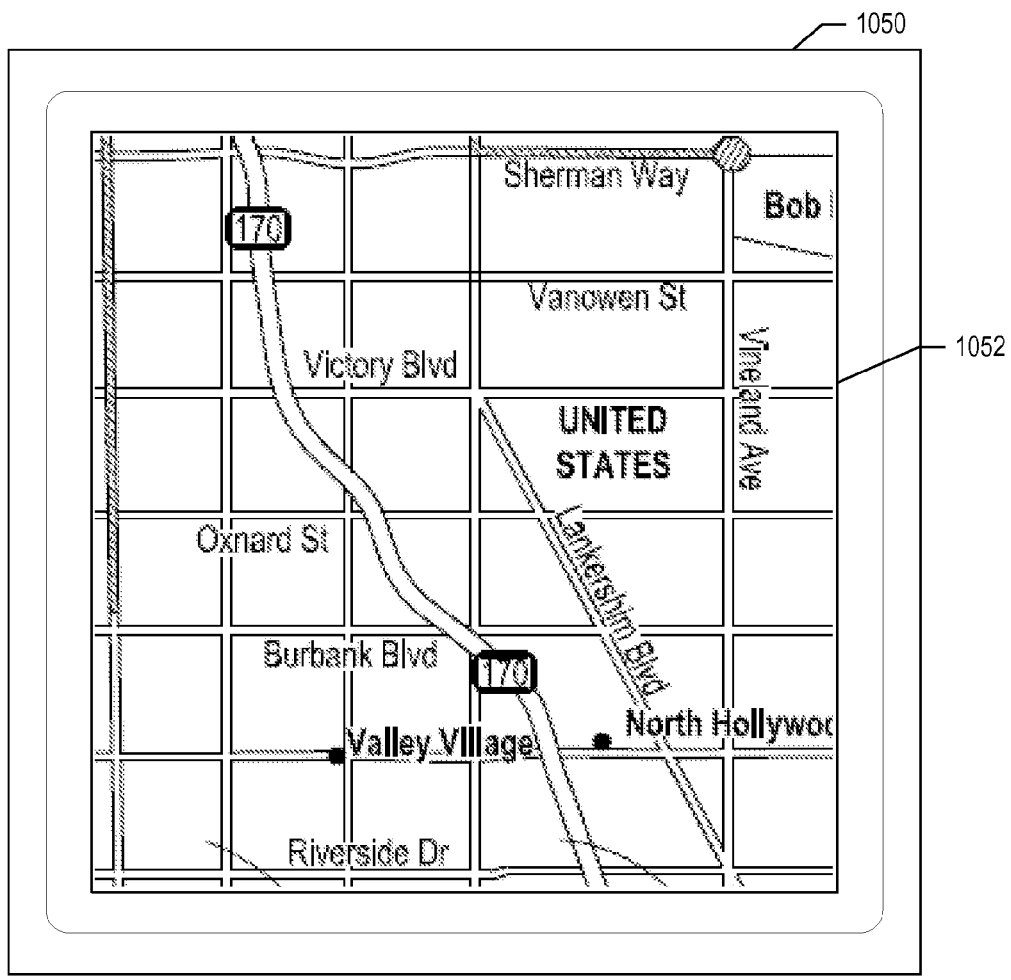
FIG. 10B illustrates an embodiment of a user interface display for outputting routes calculated using custom street classifications.

Turning to FIG. 10B, an embodiment of a user interface 1050 for outputting routes calculated using street classifications by with custom data is illustrated. The user interface 1050 can be part of one or more navigation devices associated with the plurality of vehicles, such as management devices 135 or in-vehicle devices 105. The map display 1052 of the user interface 1050 can present a street map with visual aids or directions that update in real time as the driver travels, thereby showing the driver's progress. The map display 1052 can display one or more routes, which may include one or more intermediate stops. The visual aids can include arrows or similar colored lines overlaid over a street map.

The user interface 1050 can include, but is not limited to, an LCD display, a heads-up display, an LED display, a 2D display, and/or a 3D display to instruct a user of the system which way to travel. In some embodiments, images displayed on the map display 1052 simulate motion, such as a vehicle traveling down a city street. In some embodiments, the screen is interactive. For example, in some embodiments the user can input his current and destination locations, can update costs for given streets or routes, or can change his destination en route.

In some embodiments, the routing module 200 and the user interface 1050 are integrated into a vehicle navigation system or similar system. For example, in some embodiments, the visual outputs of the calculated route output module 230 are output via the vehicle's in-dash video display, and/or the audio outputs of the calculated route output module 230 are output via the car's audio speakers. In other embodiments, the user interface 1050 is integrated within a mobile handheld device in communication with the network 145. In some embodiments, a vehicle or similar device is controlled directly by the routing module 200.

X. Terminology

As used herein, the term "street," in addition to having its ordinary meaning, can include, among other things, a road, a highway, a freeway, a toll road, a turnpike, an arterial road, a frontage road, an on-ramp, an off-ramp, a city street, a surface street, a residential street, a dirt road, a parking lot, a driveway, an intersection, a traffic circle, a roundabout, a rotary, an alley, any path upon which a vehicle can travel, combinations of the same, or the like. Further, although this specification refers primarily to streets for automobiles, trucks, and the like, the techniques described herein can also be applied to paths traveled by other vehicles, such as railroads, flight paths, and waterways.

Many variations other than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together. Execution in a cloud computing environment in some embodiments supports a multiplicity of conditions to be computed contemporaneously.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the vehicle management system 150 can be implemented by one or more computer systems or by a computer system including one or more processors. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for calculating routes for a plurality of vehicles in a vehicle fleet, the system comprising:

output interface circuitry configured to communicate with a fleet of vehicles; and processing circuitry comprising computer hardware configured to:

identify one or more custom characteristics of one vehicle of a fleet of vehicles or of routes traveled by the one vehicle, the one or more custom characteristics comprising one or more of a vehicle type, a route optimization preference, and an avoidable road condition;

calculate a plurality of simulated routes for the one vehicle on a network of streets in a geographic region between a plurality of selected waypoint locations using the one or more custom characteristics to influence determination of the plurality of simulated routes, the plurality of simulated routes comprising trial routes across the network indicative of preferred paths of travel by the one vehicle in the network and not actual paths to be traveled by the one vehicle in the network;

based at least on the plurality of simulated routes, assign one of a plurality of classifications to individual streets of the network according to an estimated importance of the individual streets of the network to routes of different lengths;

store the assigned classifications in a computer database;

subsequent to the storage of the assigned classifications, identify a starting waypoint location and an ending waypoint location for an actual route to be traveled by a fleet vehicle of the fleet of vehicles, an attribute of the fleet vehicle or of routes traveled by the fleet vehicle matching at least one of the one or more custom characteristics;

access the assigned classifications from the computer database;

calculate the actual route on the network between the starting waypoint location and the ending waypoint location using the assigned classifications to exclude at least some of the individual streets of the network from evaluation for inclusion in the actual route; and output, via the output interface circuitry, data representing the actual route for presentation to a driver of the fleet vehicle.

2. The system of claim 1, wherein the assigned classifications are indicative of a hierarchical ranking of the individual streets of the network.

3. The system of claim 1, wherein a common classification of the plurality of classifications is indicative of a similar degree of importance for use in routes on the network that have a similar length.

4. The system of claim 1, wherein the processing circuitry is configured to assign one of the plurality of classifications to one of the individual streets of the network further according to a first distance from the one of the individual streets to an initial waypoint location of one of the plurality of simulated routes and a second distance from the one of the individual streets to a final waypoint location of the one of the plurality of simulated routes.

5. The system of claim 1, wherein the processing circuitry is configured to assign a first classification of the plurality of classifications to one of the individual streets of the network when a first distance and a second distance exceed a first threshold and a second classification of the plurality of classifications to the one of the individual streets of the network when the first distance or the second distance do not exceed the first threshold, the first distance comprising a distance from the one of the individual streets to an initial waypoint location of one of the plurality of simulated routes and the second distance comprising a distance from the one of the individual streets to a final waypoint location of the one of the plurality of simulated routes.

6. The system of claim 5, wherein after the processing circuitry assigns the first classification to the one of the individual streets, the processing circuitry is configured to assign the one of the individual streets a third classification of the plurality of classifications when a third distance and a fourth distance exceed a second threshold greater than the first threshold, the third distance comprising a distance from the one of the individual streets to an initial waypoint location of another of the plurality of simulated routes and the fourth distance comprising a distance from the one of the individual streets to a final waypoint location of the another of the plurality of simulated routes.

7. The system of claim 1, wherein the processing circuitry is configured to calculate one simulated route between every set of two of the plurality of selected waypoint locations.

8. The system of claim 1, wherein at least some of the plurality of selected waypoint locations comprise intersections between two or more of the individual streets of the network.

9. The system of claim 1, wherein the processing circuitry is configured to exclude the at least some of the individual streets of the network from evaluation for inclusion in the actual route when the at least some of the individual streets are assigned a first classification of the plurality of classifications and the at least some of the individual streets are located outside of a first boundary around the starting waypoint location and a second boundary around the ending waypoint location, a size of the first boundary and the second boundary corresponding to the first classification assigned to the at least some of the individual streets.

10. The system of claim 1, wherein
the one or more custom characteristics comprise the vehicle type;
when the vehicle type is a first vehicle type, the processing circuitry is configured to exclude a first set of the individual streets of the network from evaluation for inclusion in the actual route; and
when the vehicle type is a second vehicle type different from the first vehicle type, the processing circuitry is configured to exclude a second set of the individual streets of the network from evaluation for inclusion in the actual route, the first set of the individual streets being different from the second set of the individual streets.

11. Non-transitory physical computer storage comprising instructions stored thereon for implementing, in one or more processors, a method of calculating routes for a plurality of vehicles in a vehicle fleet, the method comprising:
identifying one or more custom characteristics of one vehicle of a fleet of vehicles or of routes traveled by the one vehicle, the one or more custom characteristics comprising one or more of a vehicle type, a route optimization preference, and an avoidable road condition;
calculating a plurality of simulated routes for the one vehicle on a network of streets in a geographic region between a plurality of selected waypoint locations using the one or more custom characteristics to influence determination of the plurality of simulated routes, the plurality of simulated routes comprising trial routes across the network indicative of preferred paths of travel by the one vehicle in the network and not actual paths to be traveled by the one vehicle in the network;
based at least on the plurality of simulated routes, assigning one of a plurality of classifications to individual streets of the network according to an estimated importance of the individual streets of the network to routes of different lengths;
storing the assigned classifications in a computer database;
subsequent to the storage of the assigned classifications, identifying a starting waypoint location and an ending waypoint location for an actual route to be traveled by a fleet vehicle of the fleet of vehicles, an attribute of the fleet vehicle or of routes traveled by the fleet vehicle matching at least one of the one or more custom characteristics;
accessing the assigned classifications from the computer database;
calculating the actual route on the network between the starting waypoint location and the ending waypoint location using the assigned classifications to exclude at least some of the individual streets of the network from evaluation for inclusion in the actual route; and
outputting, via output interface circuitry, data representing the actual route for presentation to a driver of the fleet vehicle.

12. The non-transitory physical computer storage of claim 11, wherein the assigned classifications are indicative of a hierarchical ranking of the individual streets of the network.

13. The non-transitory physical computer storage of claim 11, wherein a common classification of the plurality of classifications is indicative of a similar degree of importance for use in routes on the network that have a similar length.

14. The non-transitory physical computer storage of claim 11, wherein said assigning comprising assigning one of the plurality of classifications to one of the individual streets of the network according to a first distance from the one of the individual streets to an initial waypoint location of one of the plurality of simulated routes and a second distance from the one of the individual streets to a final waypoint location of the one of the plurality of simulated routes.

15. The non-transitory physical computer storage of claim 11, wherein said assigning comprises assigning a first classification of the plurality of classifications to one of the individual streets of the network when a first distance and a second distance exceed a first threshold and a second classification of the plurality of classifications to the one of the individual streets of the network when the first distance or the second distance do not exceed the first threshold, the first distance comprising a distance from the one of the individual streets to an initial waypoint location of one of the plurality of simulated routes and the second distance comprising a distance from the one of the individual streets to a final waypoint location of the one of the plurality of simulated routes.

16. The non-transitory physical computer storage of claim 15, wherein after assigning the first classification to the one of the individual streets, further comprising assigning the one of the individual streets a third classification of the plurality of classifications when a third distance and a fourth distance exceed a second threshold greater than the first threshold, the third distance comprising a distance from the one of the individual streets to an initial waypoint location of another of the plurality of simulated routes and the fourth distance comprising a distance from the one of the individual streets to a final waypoint location of the another of the plurality of simulated routes.

17. The non-transitory physical computer storage of claim 11, wherein said calculating the plurality of simulated routes comprising calculating one simulated route between every set of two of the plurality of selected waypoint locations.

18. The non-transitory physical computer storage of claim 11, wherein at least some of the plurality of selected waypoint locations comprise intersections between two or more of the individual streets of the network.

19. The non-transitory physical computer storage of claim 11, further comprising excluding the at least some of the individual streets of the network from evaluation for inclusion in the actual route when the at least some of the individual streets are assigned a first classification of the plurality of classifications and the at least some of the individual streets are located outside of a first boundary around the starting waypoint location and a second boundary around the ending waypoint location, a size of the first boundary and the second boundary corresponding to the first classification assigned to the at least some of the individual streets.

20. The non-transitory physical computer storage of claim 11, wherein
the one or more custom characteristics comprise the vehicle type;
when the vehicle type is a first vehicle type, further comprising excluding a first set of the individual streets of the network from evaluation for inclusion in the actual route; and
when the vehicle type is a second vehicle type different from the first vehicle type, further comprising excluding a second set of the individual streets of the network from evaluation for inclusion in the actual route, the first set of the individual streets being different from the second set of the individual streets.

* * * * *